(12) United States Patent
Asano et al.

(10) Patent No.: US 8,326,516 B2
(45) Date of Patent: Dec. 4, 2012

(54) ENGINE CONTROL DEVICE

(75) Inventors: Seiji Asano, Hitachinaka (JP); Shingo Kimura, Hitachinaka (JP); Kenichi Kotabe, Mito (JP); Kenji Mizushima, Hitachinaka (JP); Kunihiko Suzuki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 381 days.

(21) Appl. No.: 12/786,903

(22) Filed: May 25, 2010

(65) Prior Publication Data

US 2010/0305832 A1    Dec. 2, 2010

(30) Foreign Application Priority Data

May 26, 2009  (JP) ................................. 2009-126091

(51) Int. Cl.
*F02D 41/04* (2006.01)
*F02D 13/02* (2006.01)
*F01L 1/34* (2006.01)
*F02P 5/04* (2006.01)

(52) U.S. Cl. .................................... 701/103; 123/90.15

(58) Field of Classification Search .......... 701/103–105, 701/115; 123/90.16, 90.17, 90.15, 406.11, 123/406.12

See application file for complete search history.

(56) References Cited

U.S. PATENT DOCUMENTS

| 6,637,391 | B2 * | 10/2003 | Muraki et al. ............. 123/90.17 |
| 6,718,920 | B2 * | 4/2004 | Hoshino et al. ............ 123/90.15 |
| 7,489,999 | B2 * | 2/2009 | Miyakoshi et al. ........... 701/103 |
| 7,869,929 | B2 * | 1/2011 | Sugihara ....................... 701/103 |

FOREIGN PATENT DOCUMENTS

| JP | 8-261026 A | 10/1996 |
| JP | 2006-90198 A | 4/2006 |

\* cited by examiner

*Primary Examiner* — Hieu T Vo
(74) *Attorney, Agent, or Firm* — Crowell & Moring LLP

(57) ABSTRACT

There is provided an engine control device which can accurately calculate a compensation coefficient used for transient compensation of an ignition timing without involving a complicated and large-scale calculation model in order to prevent a combustion deterioration and the like caused by a mechanical response delay and the like of the variable valve timing mechanism at a transition time such as an acceleration/deceleration time. The angular difference between each current real phase of the intake/exhaust valves 21 and 22 and a target phase set based on an engine load equivalent amount such as an intake air amount is obtained; the shift amount or its correlation value between a current real intake air amount and a theoretical intake air amount value calculated using a pressure inside an intake manifold when each phase of the intake/exhaust valves has reached the target phase is obtained; further a compensation coefficient for matching the shift amount or its correlation value with the angular difference is obtained; and the compensation coefficient is used to perform transient compensation of an ignition timing.

7 Claims, 14 Drawing Sheets

ENGINE CONTROL DEVICE

BACKGROUND OF THE INVENTION

1. Field of the Invention

The present invention relates to an engine control device having a variable valve timing (VVT) mechanism capable of changing a phase of an intake valve and/or an exhaust valve, and particularly to an engine control device configured to be able to prevent a combustion deterioration, a torque reduction, and the like caused by a mechanical response delay and an overshoot of the variable valve timing mechanism at a transition time such as an acceleration/deceleration time.

2. Background Art

For example, as disclosed in JP Patent Publication (Kokai) No. 8-261026A (1996), conventionally there has been used a variable valve timing mechanism capable of changing a phase of an intake valve and/or an exhaust valve (hereinafter also referred to simply as an intake/exhaust valve) in order to change a degree of overlap between an opening timing of the intake valve and a closing timing of the exhaust valve according to an engine operating state.

In an engine having such a variable valve timing mechanism, generally, an increase in the degree of overlap increases the internal EGR amount, leading to a reduction in charging efficiency; conversely, a reduction in the degree of overlap reduces the internal EGR amount, leading to an increase in charging efficiency. The internal EGR amount and the charging efficiency are closely related to an engine output torque, combustion characteristics, exhaust performance (exhaust emission characteristics), and the like.

Note that the variable valve timing mechanism is configured to change a valve phase by a hydraulic, electric actuator, and other actuator. Therefore, a change in valve phase at a transition time (at least the opening timing of the intake valve and/or the closing timing of the exhaust valve) entails a mechanical response delay (following delay) or an overshoot.

In contrast to this, the ignition timing at a transition time when a change in phase of an intake/exhaust valve is made is set assuming that the phase of the intake/exhaust valve has reached a target phase. If the following delay or overshoot occurs, the ignition timing does not match an optimal ignition timing, leading to a torque reduction or a combustion deterioration (occurrence of knocking or the like).

In order to solve such problems, for example, JP Patent Publication (Kokai) No. 2006-090198A proposes to correct the ignition timing at a transition time in consideration of a change in temperature and pressure inside a combustion chamber with a change in phase of the intake valve.

SUMMARY OF THE INVENTION

However, according to JP Patent Publication (Kokai) No. 2006-090198A, a temperature and a pressure inside the combustion chamber are used as internal state variables to correct the ignition timing based on a deviation between the temperature and the pressure inside the combustion chamber at a target phase time of an intake/exhaust valve and the temperature and the pressure inside the combustion chamber at a current time of the intake/exhaust valve. Here, note that the temperature and the pressure inside the combustion chamber are caused by a chemical change, combustion. Therefore, unfortunately, the use of a chemical change as internal state variables involves a complicated calculation and thus may increase an error.

In view of the above problems, the present invention has been made, and an object of the present invention is to provide an engine control device which can accurately calculate compensation coefficients used for transient compensation of an ignition timing without involving a complicated and large-scale calculation model in order to prevent a combustion deterioration and the like caused by a mechanical response delay and the like of the variable valve timing mechanism at a transition time such as an acceleration/deceleration time.

In order to achieve the above object, the engine control device according to the present invention basically has a variable valve timing mechanism capable of changing a phase of an intake valve and/or an exhaust valve; calculates an angular difference between a current real phase of the intake/exhaust valve and a target phase set based on an engine load equivalent amount such as an intake air amount; calculates a shift amount or its correlation value between a current real intake air amount and a theoretical intake air amount value calculated using a pressure inside an intake manifold when a phase of the intake/exhaust valve has reached the target phase; further calculates a compensation coefficient for matching the shift amount or its correlation value with the angular difference; and uses the compensation coefficient to perform transient compensation of an ignition timing.

In a preferred aspect, a configuration is made such that as the shift amount or its correlation value, a ratio between a real intake air amount and a theoretical intake air amount value calculated using an engine speed, an engine displacement, a gas constant, an intake temperature and an ideal gas equation of state is obtained.

In another preferred aspect, a configuration is made such that as the shift amount or its correlation value, is obtained a ratio between a real intake air amount and a theoretical intake air amount value calculated using an engine speed, an engine displacement, a gas constant, an intake temperature fixed to a predetermined temperature and an ideal gas equation of state is obtained.

In this case, in a preferred aspect, a configuration is made such that an approximation curve indicating a relationship between a phase of the intake/exhaust valve and an intake air amount is calculated for each operating range; a coefficient of the approximation curve is stored for each operating range; and the stored coefficient is used to calculate the ratio between a current real intake air amount and a theoretical intake air amount value at the target phase time.

In yet another preferred aspect, an ignition timing at a transition time is configured to be corrected such that if a ratio between the real intake air amount and the theoretical intake air amount value is equal to or greater than 1.0, the ignition timing is corrected to a retard angle side; and if the ratio is less than 1.0, the ignition timing is corrected to an advance angle side.

In still another preferred aspect, at a time of transient compensation of the ignition timing, a configuration is made such that the ignition timing is corrected by a sensitivity according to an intake air amount.

In further another aspect, at a time of transient compensation of the ignition timing, a configuration is made such that the ignition timing is corrected by a transition width and a transition interval according to an intake air amount.

The engine control device according to the present invention is configured such that a shift amount or its correlation value between a theoretical intake air amount value and a current real intake air amount is calculated as well as a compensation coefficient for correcting the shift amount or its correlation value according to an angular difference between a real phase and a target phase is calculated, and then the compensation coefficient is used to make a transient compensation of the ignition timing. In this case, a change in the compensation coefficient indicates a change in the engine charging efficiency, and the change in the engine charging efficiency indicates a change in internal EGR amount. Therefore, a compensation of the ignition timing according to the change in the internal EGR amount can prevent a combustion deterioration (occurrence of knocking or the like) due to an excessive advance angle of an intake/exhaust valve at a transition time, a torque down due to an excessive retard angle, and the like. Consequently, this allows optimal control of torque, and is hoped to improve fuel efficiency In addition, a simple use of an approximate expression in a process of calculating the compensation coefficient can prevent a complicated and large-scale calculation model and can determine a variable from actual data, thus reducing an error.

Further setting a sensitivity, a transition width, a transition interval, and the like according to an operating state (a parameter indicating the operating state) such as an intake air amount to the compensation coefficient of the ignition timing can further reduce an error as well as further increase combustion characteristics.

DESCRIPTION OF SYMBOLS

Figure 1:
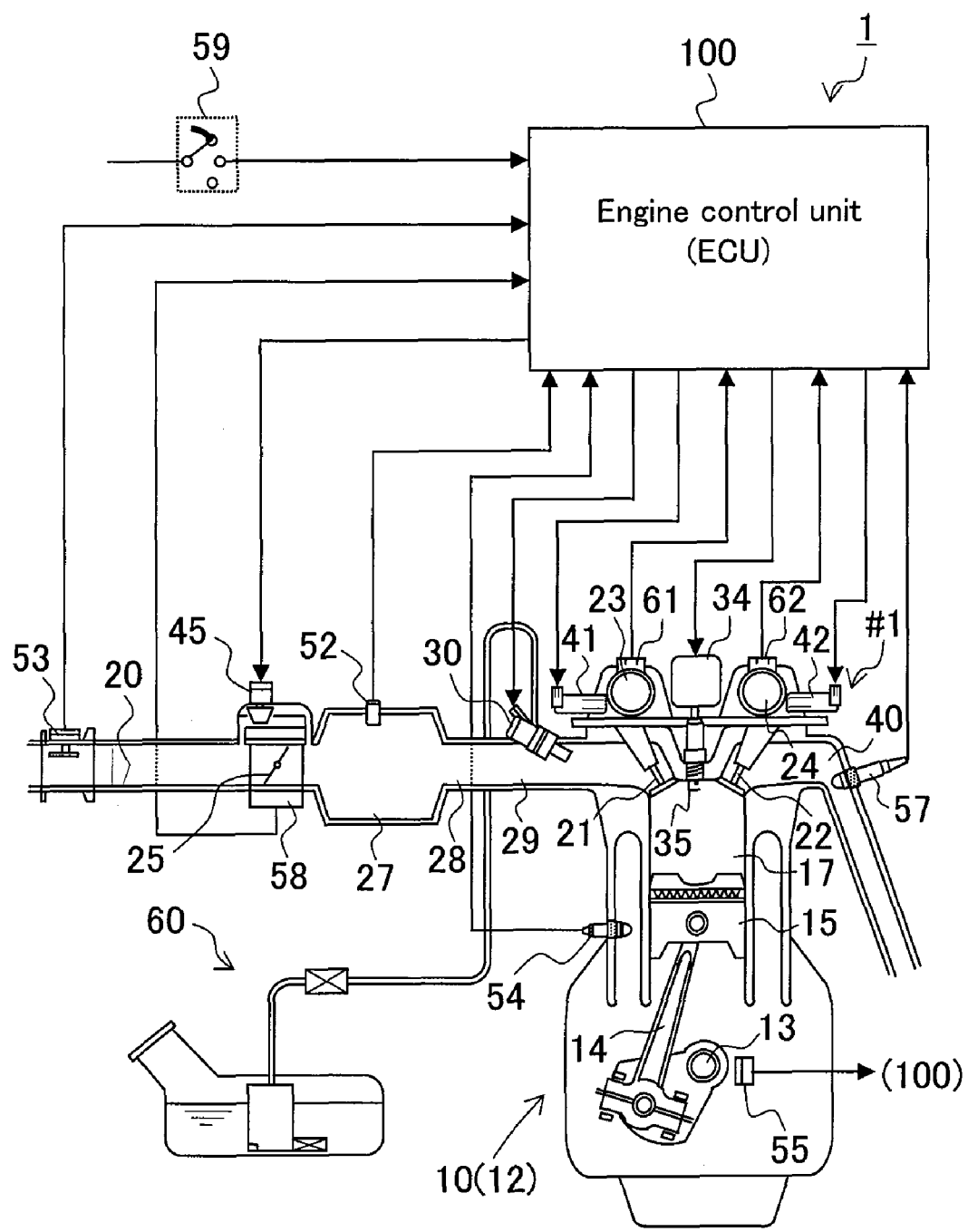
FIG. 1 is a schematic configuration view illustrating an embodiment of a control device according to the present invention as well as an example of a vehicle-mounted engine to which the same is applied.

20 Intake passage
25 Throttle
30 Fuel injection valve
35 Spark plug
52 Intake temperature sensor
53 Airflow sensor
41 Intake valve hydraulic actuator
42 Exhaust valve hydraulic actuator
61 Intake valve phase sensor
62 Exhaust valve phase sensor
100 Control unit
102 Intake air amount calculation unit
105 Intake/exhaust valve target phase calculation unit
106 Intake efficiency compensation unit
110 Ignition timing compensation unit

DETAILED DESCRIPTION OF THE PREFERRED EMBODIMENTS

Hereinafter, embodiments of the present invention will be described by referring to the accompanying drawings.

FIG. 1 is a schematic configuration view illustrating an embodiment (first embodiment) of a control device according to the present invention as well as an example of a vehicle-mounted engine to which the same is applied.

In FIG. 1, an engine 10 to which a control device 1 of the present embodiment is applied is a spark-ignition multi-cylinder gasoline engine having, for example, four cylinders #1, #2, #3, and #4 (in the figure, #1 is illustrated as a representative example). The engine 10 includes a cylinder 12 having a cylinder head and a cylinder block; and a piston 15 slidably inserted into each cylinder #1, #2, #3, and #4 of the cylinder 12. The piston 15 is coupled to a crankshaft 13 via a con rod 14. Above the piston 15, a combustion operating chamber 17 having a combustion chamber (ceiling or roof portion) with a predetermined shape is defined. A spark plug 35 connected to an ignition unit having an ignition coil 34 and the like is juxtaposedly disposed in the combustion operating chamber 17 of each cylinder #1, #2, #3, and #4.

Air used for combustion of fuel passes through an air cleaner (not illustrated) and is taken in an intake passage 20 which includes a tubular passage portion (throttle body) which further includes a hot wire airflow sensor or other airflow sensor 53, an electronic throttle valve 25, and the like; a collector 27; an intake manifold 28; an intake port 29; and the like. Then, the air passes through an intake valve 21 provided at a downstream end thereof (end portion of the intake port 29) and is taken into the combustion operating chamber 17 of each cylinder #1, #2, #3, and #4. Meanwhile, a fuel injection valve 30 for injecting fuel towards the intake port 29 is juxtaposedly provided for each cylinder #1, #2, #3, and #4 at a downstream portion (intake manifold 28) of the intake passage 20. An intake temperature sensor 52 is provided in the collector 27.

An air-fuel mixture of the air taken into the combustion operating chamber 17 and the fuel injected from the fuel injection valve 30 is burned by spark ignition by the spark plug 35. The combustion exhaust gas (exhaust gas) is discharged from the combustion operating chamber 17. Then, the exhaust gas passes through an exhaust valve 22 into an exhaust passage 40 which includes an exhaust pipe in which an exhaust port, an exhaust manifold, and an exhaust gas purifying catalyst (e.g., three-way catalyst) are provided. Finally, the exhaust gas is discharged outside (into the atmosphere). An oxygen sensor (air/fuel ratio sensor) 57 is provided at an upstream side from the catalyst in the exhaust passage 40.

The fuel injection valve 30 provided for each cylinder (#1, #2, #3, and #4) receives fuel (e.g., gasoline) from a fuel tank. The fuel is regulated to a predetermined fuel pressure by a fuel supply mechanism 60 having a fuel pump, a fuel pressure regulator, and the like. The fuel injection valve 30 is configured to be driven to open the valve by a valve opening pulse signal having a pulse width (corresponding to a valve opening time) according to an operating state of that time, which is supplied from an engine control unit (ECU) 100 described later; and to inject an amount of fuel according to the valve opening time toward the intake port 29.

In addition to the above, according to the engine 10 of the present embodiment, in order to change each phase of the intake valve 21 and the exhaust valve 22, more specifically, in order to mainly change a degree of overlap between an opening timing of the intake valve 21 and a closing timing of the exhaust valve 22 according to an engine operating state, an intake valve hydraulic actuator 41 and an exhaust valve hydraulic actuator 42 are provided as an adjunct in intake/exhaust camshafts 23 and 24 respectively as a variable valve timing (VVT) mechanism; as well as an intake valve phase sensor 61 and an exhaust valve phase sensor 62 for detecting each phase of the intake/exhaust valves 21 and 22 (phase of the camshafts 23 and 24) are provided as an addition.

According to the present embodiment, at a transition time such as an acceleration/deceleration time, a control unit 100 described later controls the intake/exhaust valve hydraulic actuators 41 and 42 so as to change the phase of the intake valve 21 and the phase of the exhaust valve 22, for example, in an opposite direction by the same angle respectively (the intake/exhaust valves 21 and 22 are moved in a direction of increasing or decreasing the degree of overlap at the same time).

In addition, in order to perform idle speed control (ISC), a bypass passage for bypassing the throttle valve 25 is provided in the intake passage 20 as well as an ISC valve 45 is interposedly provided in the bypass passage. Note that according to the present embodiment, the idle speed control is configured to be performed by controlling the opening/closing of the ISC valve 45, but the idle speed control may be performed by controlling the opening degree of the throttle 25.

Meanwhile, in order to perform various controls of the engine 10 such as fuel injection control for the fuel injection valve 30 and ignition timing control for the spark plug 35, the engine 10 includes an engine control unit (ECU) 100 having a microcomputer therein.

Figure 2:
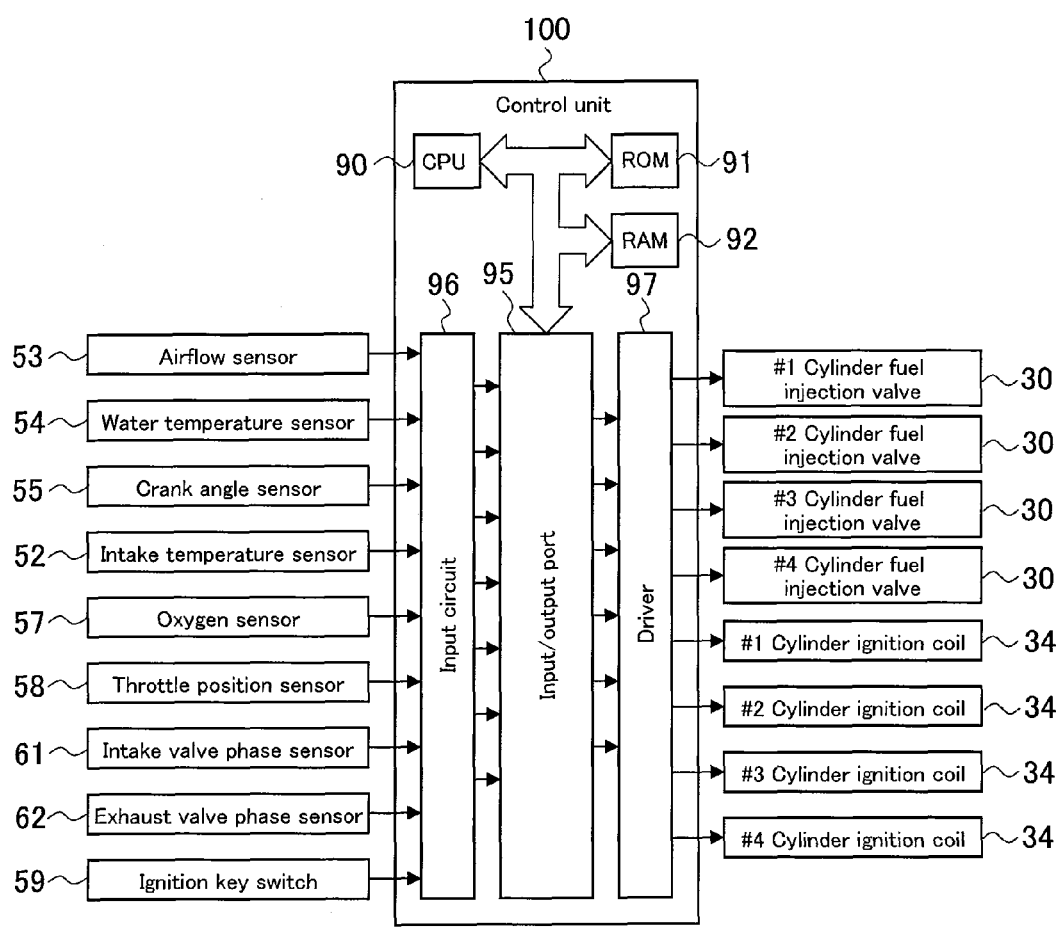
FIG. 2 is a schematic view illustrating an internal configuration of a control unit illustrated in FIG. 1.

As is well known and illustrated in FIG. 2, the control unit 100 basically includes a CPU 90, a ROM 91, a RAM 92, an input/output port (I.O) 95, an input circuit 96, a driver (drive circuit) 97, and the like. In the control unit 100, signals from the sensors are inputted to the input circuit 96 in which noise is removed therefrom and then are sent to the input/output port 95. The value of the input port 95 is stored in the RAM 92 and arithmetic processing is performed thereon by the CPU 90. A control program coding the content of the arithmetic processing is preliminarily written in the ROM 91. A value indicating each actuator operation amount undergoing arithmetic processing according to the control program is stored in the RAM 92 and then sent to the output port 95.

The control unit 100 receives input signals such as a signal according to the intake air amount detected by the airflow sensor 53; a signal indicating the rotation (engine speed) and the phase (crank angle) of the crankshaft 13 obtained from the crank angle sensor (engine speed sensor) 55 provided as an addition in the crankshaft 13 (for example, a pulse signal is outputted for each rotation angle from the crank angle sensor 55); a signal indicating each phase of the intake/exhaust valves 21 and 22 detected by the intake valve phase sensor 61 and the exhaust valve phase sensor 62 provided as an addition in the intake/exhaust camshafts 23 and 24 respectively; a signal according to the oxygen concentration (air/fuel ratio) from the oxygen sensor 57 provided at an upstream side from the three-way catalyst in the exhaust passage 40; a signal according to the engine cooling water temperature detected by the water temperature sensor 54 provided in the cylinder 12; a signal from an ignition key switch 59 which is a main switch for starting and stopping the engine 10; a signal according to the intake temperature detected by the intake temperature sensor 52 provided in a portion of the collector 27 in the intake passage 20; and a throttle position signal detected by the throttle position sensor 58.

Based on the various input signals, the control unit 100 recognizes an engine operating state, and based on the operating state, the control unit 100 calculates major operation amount of the engine such as the fuel injection amount and the ignition timing.

More specifically, in the control unit 100, based on the engine operating state, the fuel injection amount to be injected for each cylinder #1, #2, #3, and #4 is calculated; a valve opening pulse signal having a pulse width corresponding to the calculated fuel injection amount is generated; the valve opening pulse signal is amplified to an energy enough to open the fuel injection valve 30 by the driver 97; and then the signal is supplied as the fuel injection valve drive signal to the fuel injection valve 30 for each cylinder #1, #2, #3, and #4 at a predetermined timing. In addition, a drive signal is sent from the driver 97 to an ignition coil 34 of each cylinder #1, #2, #3, and #4 so as to be ignited at the ignition timing calculated by the control unit 100.

Next, the description will focus on the transient compensation of the ignition timing executed by the control unit 100 in order to prevent a combustion deterioration and the like caused by a mechanical response delay of the variable valve timing mechanism at a transition time such as an acceleration/deceleration time.

The present embodiment is configured such that the ratio as the shift amount or its correlation value between a current real intake air amount and a theoretical intake air amount value calculated using an intake manifold internal pressure (estimated value) when each phase of the intake/exhaust valves 21 and 22 has reached the target phase is obtained; further a compensation coefficient for correcting the ratio according to the angular difference between the real phase and the target phase of each of the intake/exhaust valves 21 and 22 is obtained; and the compensation coefficient is used to perform transient compensation of an ignition timing.

Hereinafter, this will be described in detail.

Figure 3:
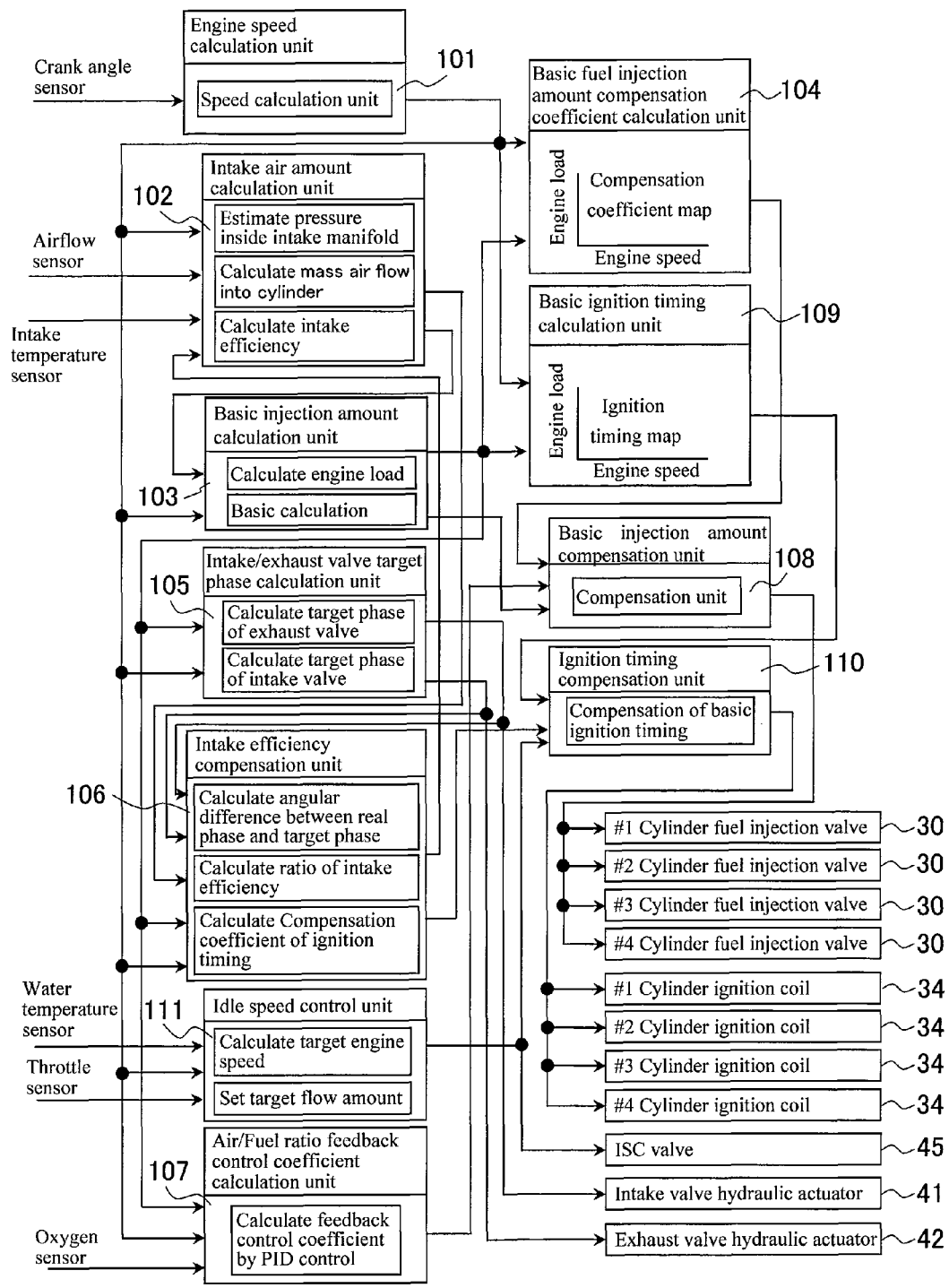
FIG. 3 is a functional block diagram illustrating an outline of control executed by the control unit.

As illustrated by a functional block diagram in FIG. 3, the control unit 100 includes an engine speed calculation unit 101, an intake air amount calculation unit 102, a basic injection amount calculation unit 103, a basic injection amount compensation coefficient calculation unit 104, an intake/exhaust valve target phase calculation unit 105, an intake efficiency compensation unit 106, an air/fuel ratio feedback control coefficient calculation unit 107, a basic injection amount compensation unit 108, a basic ignition timing calculation unit 109, an ignition timing compensation unit 110, and a target idle speed calculation unit 111.

The engine speed calculation unit 101 counts the number of times (incoming count) of changes (e.g., a rising edge or falling edge of the pulse) per unit time of pulse signals from the crank angle sensor 55 and performs predetermined arithmetic processing on the count value to calculate the engine speed per unit time.

The intake air amount calculation unit 102 performs voltage-to-flow-conversion on a signal from the airflow sensor 53 and calculates the intake air amount (detected intake air amount=real intake air amount) passing through a portion of the airflow sensor 53 in the intake passage 20; based on the intake air amount, an engine speed, an intake temperature, and the like, calculates the intake manifold internal pressure (estimated value); as well as calculates the mass air flow into cylinder (theoretical value) fed in the cylinder 12 (combustion operating chamber 17); based on the above, further calculates the current real intake efficiency and an intake efficiency (target intake efficiency) when each phase of the intake/exhaust valves 21 and 22 has reached the target phase; and calculates the ratio (ratio between the real intake air amount and the theoretical intake air amount value which corresponds to the shift amount or its correlation value).

The basic injection amount calculation unit 103 calculates the intake air amount (corresponding to an engine load) per engine rotation in a cylinder based on the engine speed and the intake air amount as well as calculates the basic injection amount common to each cylinder #1, #2, #3, and #4 based on the engine load.

Based on the engine speed and the engine load, the basic injection amount compensation coefficient calculation unit 104 sets a compensation coefficient in each engine operating range to the basic injection amount calculated by the basic injection amount calculation unit 103 (which means reading a coefficient of a corresponding operating range from a compensation coefficient map. Note that in the present description, the terms "set" and "obtain" are treated synonymously as "calculate").

The intake/exhaust valve target phase calculation unit 105 sets the target phase of each of the intake/exhaust valves 21 and 22 based on the engine speed and the engine load (reads from the map).

The intake efficiency compensation unit 106 calculates the angular difference between the real phase and the target phase of each of the intake/exhaust valves 21 and 22; and calculates the compensation coefficient for correcting the ratio of the intake efficiency, namely, the compensation coefficient η for performing the transient compensation of the ignition timing based on the angular difference.

Based on a signal from the oxygen sensor 57, the air/fuel ratio feedback control coefficient calculation unit 107 calculates an air/fuel ratio feedback control coefficient for PID control so as to maintain the air-fuel mixture used for combustion at a target air/fuel ratio. Note that according to the present embodiment, the oxygen sensor 57 outputs a proportional signal to the exhaust air/fuel ratio, but may output a high or low signal depending on whether the exhaust gas is on a rich side or a lean side with respect to the theoretical air/fuel ratio.

The basic injection amount compensation unit 108 corrects the basic injection amount calculated by the basic injection amount calculation unit 103 by the basic injection amount compensation coefficient calculated by the basic injection amount compensation coefficient calculation unit 104, the air/fuel ratio feedback control coefficient calculated by the air/fuel ratio feedback control coefficient calculation unit 107, the water temperature compensation coefficient set based on the engine cooling water temperature detected by the water temperature sensor 54, and the like.

The basic ignition timing calculation unit 109 sets an optimal basic ignition timing in each engine operating range based on the engine speed and the engine load by a map search and the like.

The ignition timing compensation unit 110 performs a compensation by the engine cooling water temperature and the like and a compensation by the compensation coefficient η and the like calculated by the intake efficiency compensation unit 106 to the ignition timing obtained by a map search by the basic ignition timing calculation unit 109.

Figure 4:
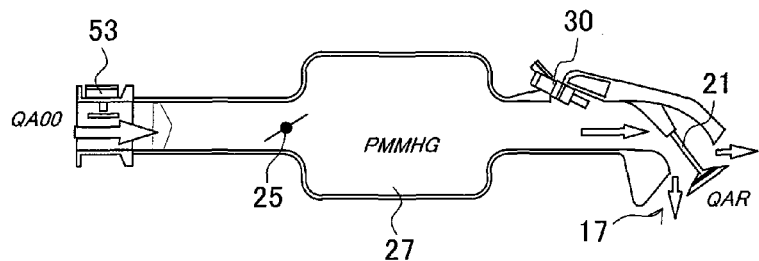
FIG. 4 illustrates an example of a physical model of an engine intake system.

FIG. 4 illustrates an example of a physical model of an engine intake system targeted by the present invention. An entrance of the present intake system has an airflow sensor 53 which detects an intake air amount actually fed into the intake system. A detected (real) intake air amount QA00 detected by the sensor 53, an intake manifold internal pressure (estimated value) PMMHG, an engine speed, an engine displacement, an intake temperature, and a nonlinear intake efficiency determined by an engine operating range are used to calculate a mass air flow QAR into cylinder (theoretical intake air amount value) flowing into the cylinder 12 (combustion operating chamber 17).

Figure 5:
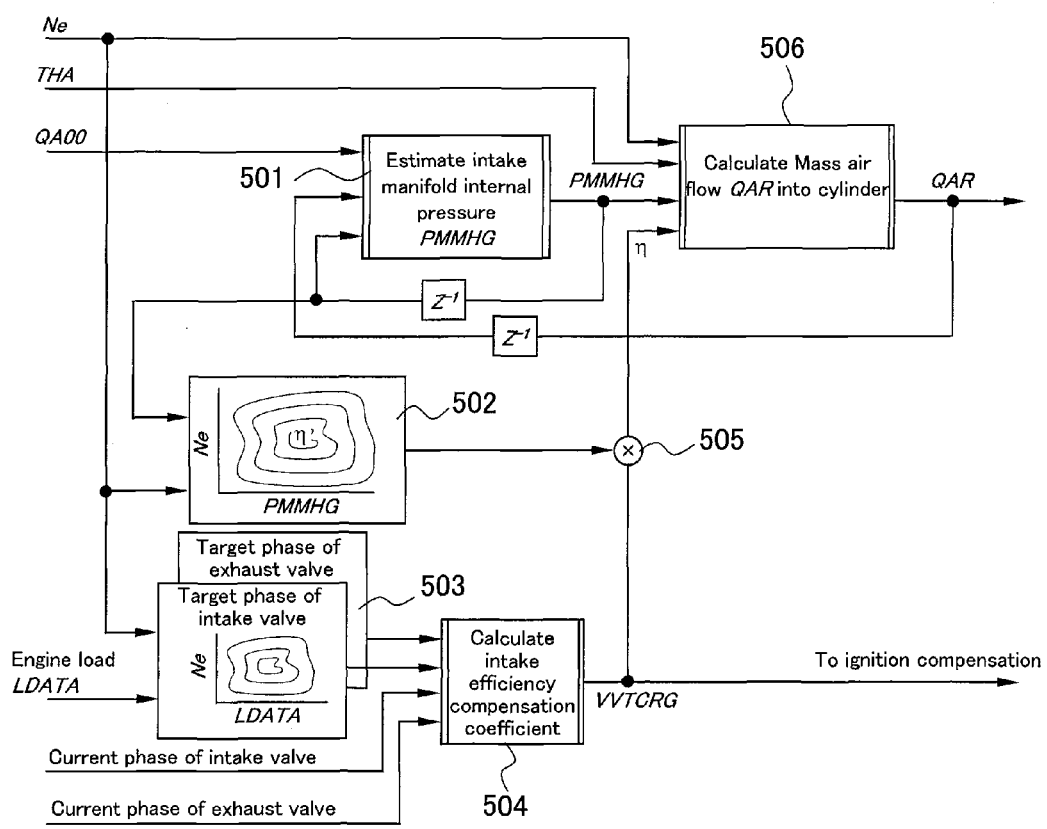
FIG. 5 is a block diagram illustrating an example of a process of calculating a mass air flow into cylinder.

FIG. 5 illustrates an example of a block diagram for calculating the mass air flow QAR into cylinder. A block 501 calculates (estimates) a present intake manifold internal pressure PMMHG using the intake air amount QA00 detected by the airflow sensor 53, the previous mass air flow QAR into cylinder, and the previous PMMHG.

A block 502 uses an engine speed Ne and the previous intake manifold internal pressure PMMHG to perform a map search for a nonlinear element intake efficiency η. A block 503 uses the engine speed Ne and an engine load LDATA obtained by the aforementioned block 103 of FIG. 3 to perform a map search for each target phase of the intake/exhaust valves 21 and 22. Based on the angular difference between the target phases obtained by the block 503 and the current phases (real phases) detected by the intake/exhaust valve phase sensors 61 and 62, a block 504 calculates a compensation coefficient VVTCRG of the intake efficiency η (described later). A multiplier 505 multiplies the calculated intake efficiency compensation coefficient VVTCRG and the intake efficiency obtained by a map search by the block 502. Thereby, the intake efficiency η is corrected according to the angular difference. A block 506 uses the corrected intake efficiency η, the intake manifold internal pressure PMMHG, the intake temperature THA, and the engine speed to calculate the mass air flow QAR into cylinder (theoretical intake air amount value). Note that the calculated intake efficiency compensation coefficient VVTCRG is used for ignition timing control (transient compensation) (described later). Note also that if the intake temperature sensor 52 is not provided, the calculation may be made by fixing the intake temperature to a predetermined temperature (e.g., 27° C.) where any measurement error causes no problem.

Now, the theoretical expressions for calculating the intake manifold internal pressure PMMHG and the mass air flow QAR into cylinder are listed as the following expression (1), expression (2), and expression (3).

[Expression 1]

$$\frac{dPMMHG}{dt} = \frac{R \cdot THA}{KIMV} \cdot (QA00 - QAR) \quad (1)$$

[Expression 2]

$$PMMHG(n) = \frac{R \cdot THA}{KIMV} \cdot \Delta T \cdot (QA00 - QAR) + PMMHG(n-1) \quad (2)$$

[Expression 3]

$$QAR = \frac{PMMHG \cdot KSV \cdot \frac{Ne}{2}}{R \cdot THA} \cdot \eta \cdot VVTCRG \quad (3)$$

Note that in the above expression (1), expression (2), and expression (3), terms have the following meanings:
R: Gas constant
KIMV: Intake manifold volume
ΔT: Calculation period
η: Intake efficiency when each phase of the intake/exhaust valves is the target phase
VVTCRG: Intake efficiency compensation coefficient The expression (1) is a theoretical expression in a continuous area, indicating that air flowing into or out from the intake manifold (between the throttle valve and the intake valve) at a very small time forms a pressure gradient inside the intake manifold. The expression (2) is a discretized expression of the expression (1). The intake manifold internal pressure PMMHG is calculated by executing the expression (2). The expression (3) is an expression for calculating the mass air flow QAR into cylinder using the intake manifold internal pressure PMMHG obtained by the expression (2), the engine speed Ne, the intake temperature THA, and the like. The base is an ideal gas equation of state (for calculating the theoretical intake air amount value), but the actual value does not match the theoretical value depending on the opening state of the intake/exhaust valves. In light of this, the intake efficiency η and the intake efficiency compensation coefficient VVTCRG are multiplied as a nonlinear element to the theoretical intake air amount value. Note that as described above, the intake temperature may be fixed to a predetermined value.

Figure 6:
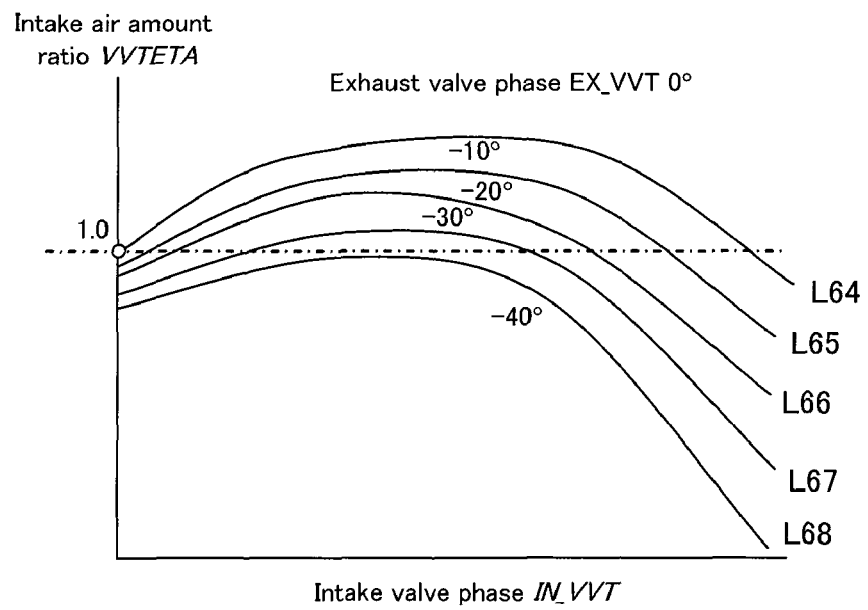
FIG. 6 illustrates an example of a relationship between an intake valve phase and an intake air amount ratio.

FIG. 6 illustrates an example of a relationship between a phase IN_VVT of the intake valve 21 and an intake air amount ratio VVTETA. The intake air amount ratio VVTETA on the vertical axis indicates a ratio assuming that the intake air amount is 1.0 when the intake/exhaust valves 21 and 22 are located at a default position (with the phase 0° when no hydraulic pressure is applied). The horizontal axis indicates the phase IN_VVT of the intake valve 21. A curve L64 indicates that phase EX_VVT of the exhaust valve 22 is 0° (default position of the exhaust valve); and each of the curves L65 to 68 indicates an intake air amount ratio curve when the phase of the exhaust valve 22 is −10° to −40° respectively. Note that according to the present embodiment, the phase 10° of the intake valve 21 indicates that the valve opens at 10° before the exhaust top dead center; and the phase −10° of the exhaust valve 22 indicates that the valve closes at 10° after the exhaust top dead center (in this case, the degree of overlap of the intake/exhaust valves 21 and 22 is 20° in terms of the crank angle).

Figure 7:
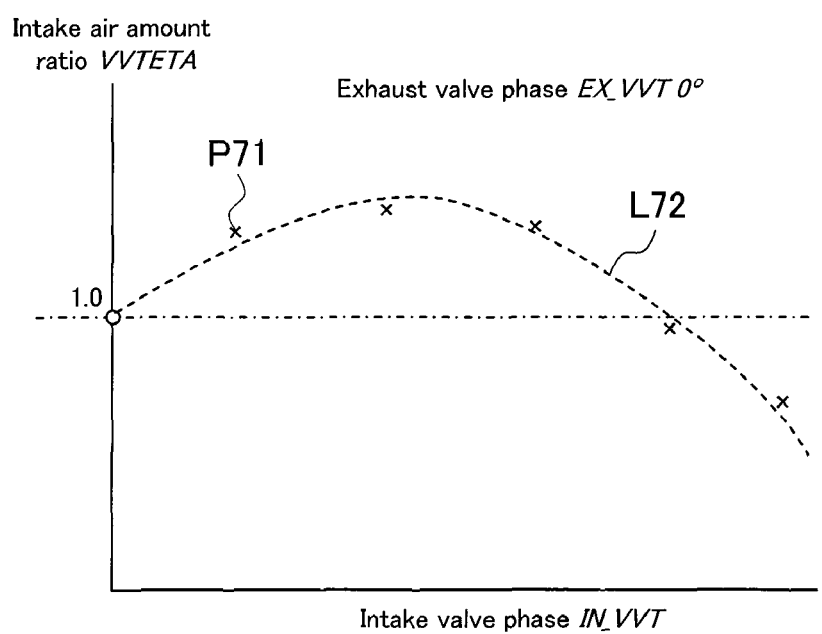
FIG. 7 illustrates an example of an approximation curve representing the relationship between an intake valve phase and an intake air amount ratio.

FIG. 7 illustrates an example of an approximation curve representing the relationship between the phase IN_VVT of the intake valve 21 and the intake air amount ratio VVTETA. A point P71 indicates an actually measured intake air amount ratio assuming a predetermined engine speed, a predetermined intake manifold internal pressure, a predetermined crank angle of a phase of the intake valve 21, and a predetermined crank angle of a phase of the exhaust valve 22. From the above, an approximation curve L72 is obtained indicating the relationship between the phase IN_VVT of the intake valve 21 and the intake air amount ratio VVTETA. According to the present approximation curve L72, a 2 to 3 dimensional curve is used simply by considering the calculation load of the microcomputer, but a further higher-dimensional curve may be used as long as the calculation load is allowed.

A theoretical expression for replacing the relationship between the phase IN_VVT of the intake valve 21 and the intake air amount ratio VVTETA illustrated in FIG. 7 with an approximation curve is shown by the following expression (4). According to the present embodiment, a 3-d approximation is used, indicating each of the coefficients (A, B, C, and D): a predetermined engine speed, a predetermined intake manifold internal pressure, the intake air amount ratio VVTETA at a predetermined crank angle of a phase of the exhaust valve 22, and a 3-d approximation of a phase of the intake valve 21 respectively (the detail will be given later by referring to FIG. 10).

[Expression 4]

$$VVTETA = A \cdot IN\_VVT^3 + B \cdot IN\_VVT^2 + C \cdot IN\_VVT + D \quad (4)$$

Figure 8:
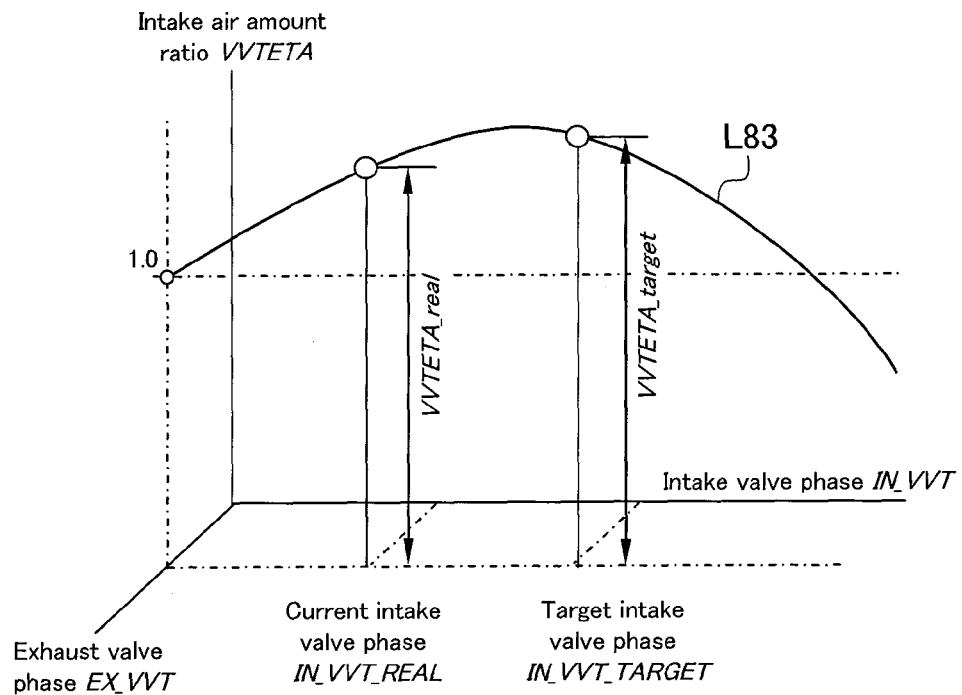
FIG. 8 illustrates an example of a current real phase and a target phase of an intake valve, a current real phase and a target phase of an exhaust valve, and a current value and a target value of an intake air amount ratio.

FIG. 8 illustrates an example of a current real phase IN_VVT_real and a target phase IN_VVT_target of the intake valve 21, a current real phase EX_VVT_real and a target phase EX_VVT_target of the exhaust valve 22, and a current value (_real) and a target value (_target) of the intake air amount ratio VVTETA. As the phases of the intake/exhaust valves 21 and 22 move from the real phase (_real) to the target phase (_target), the intake air amount ratio VVTETA moves along the curve L83 toward the target value (_target) and finally reaches the target value (_target).

Here, in the aforementioned expression (3), the theoretical intake air amount value calculated using the engine speed Ne, the intake manifold internal pressure PMMHG, the intake temperature THA, and the like is multiplied by the intake efficiency η and the intake efficiency compensation coefficient VVTCRG as the nonlinear element to obtain the mass air flow QAR into cylinder. Meanwhile, as shown in the following expression (5), the intake efficiency compensation coefficient VVTCRG is expressed by a value (coefficient) obtained by dividing the current intake air amount ratio VVTETA_real by the intake air amount ratio (target value) VVTETA_target when each phase of the intake/exhaust valves 21 and 22 reaches the target phase.

[Expression 5]

$$VVTCRG = \frac{VVTETA\_real}{VVTETA\_target} \quad (5)$$

It is understood from the above expression (5) that when the target phase is equal to the real phase, the intake efficiency compensation coefficient VVTCRG becomes 1.0, indicating that no compensation is applied to the intake efficiency η.

Figure 9:
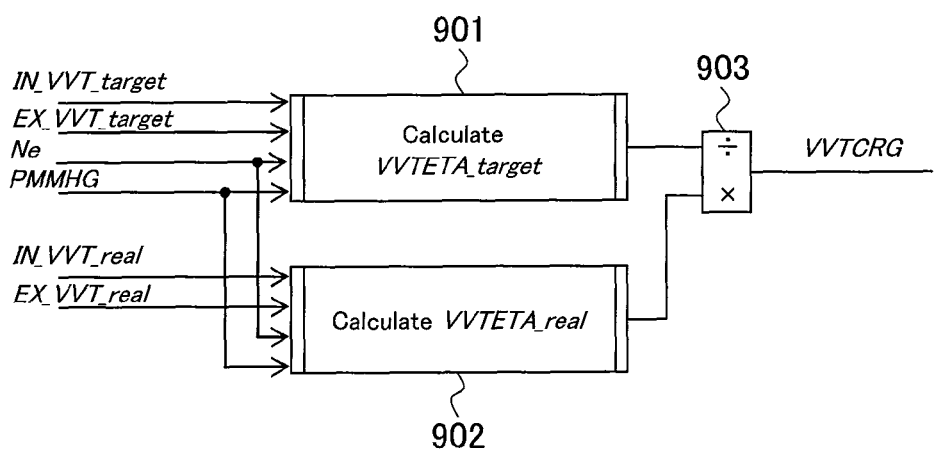
FIG. 9 is a block diagram illustrating an example of a process of calculating an intake efficiency compensation coefficient.

FIG. 9 illustrates an example of a block diagram for calculating the intake efficiency compensation coefficient VVTCRG. A block 901 calculates the target value VVTETA_target of the intake air amount ratio using the intake/exhaust valve target phase (IN&EX_VVT_target), the engine speed Ne, and the intake manifold pressure PMMHG. A block 902 calculates the current value VVTETA_real of the intake air amount ratio using the intake/exhaust valve real phase (IN&EX_VVT_real), the engine speed Ne, and the intake manifold pressure PMMHG. The divider 903 divides the current value (_real) of the intake air amount ratio VVTETA by the target value (_target) (to obtain the ratio), and the ratio is used as the intake efficiency compensation coefficient VVTCRG.

Figure 10:
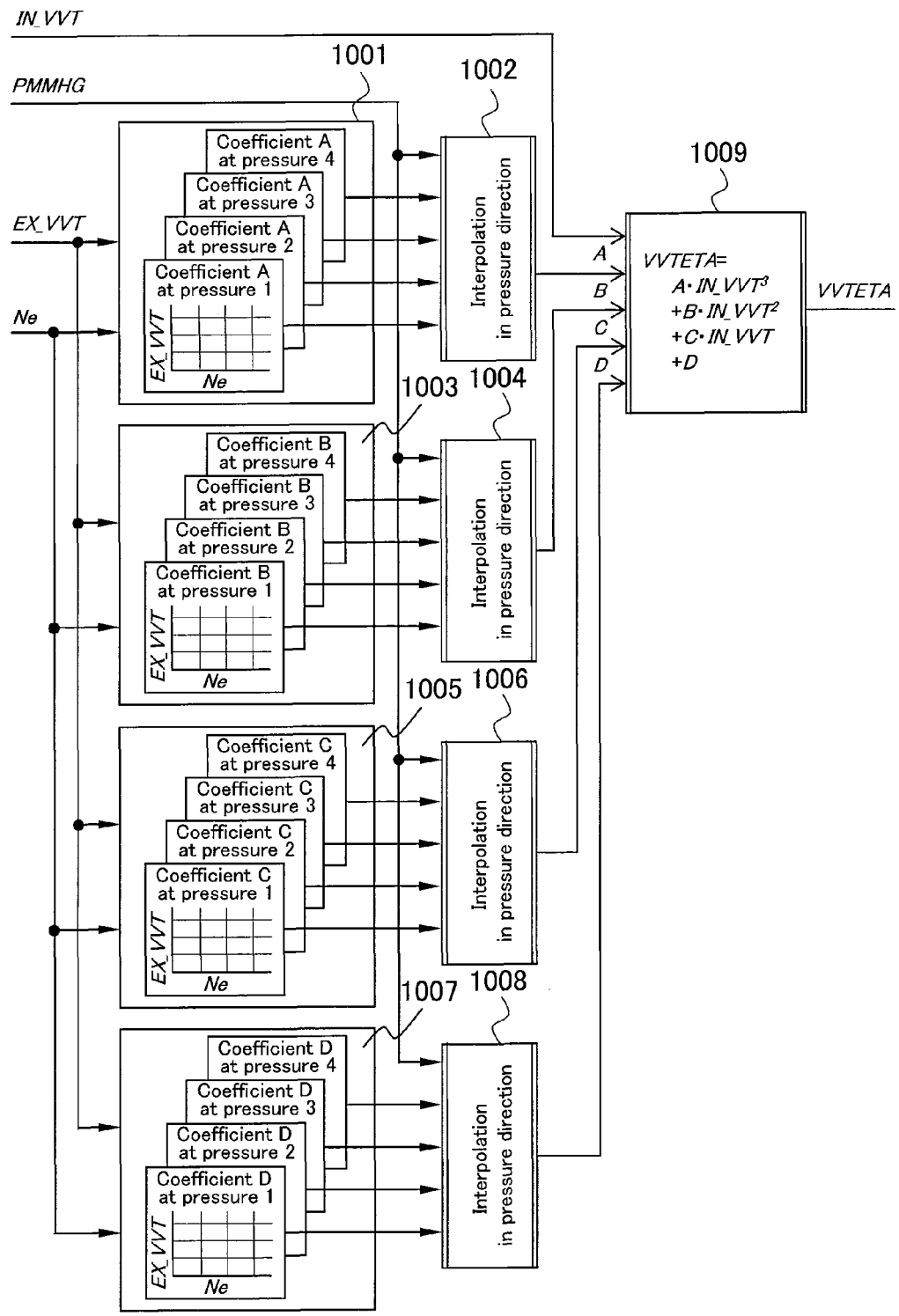
FIG. 10 is a block diagram illustrating an example of a process of calculating an intake air amount ratio.

FIG. 10 illustrates an example of a block diagram for calculating the intake air amount ratio VVTETA. A block 1001 uses the phase EX_VVT of the exhaust valve 22 and the engine speed Ne to obtain a 3-d function coefficient A when the intake manifold internal pressure PMMHG is each predetermined pressure (pressure 1, pressure 2, pressure 3, and pressure 4). A block 1002 performs interpolation in a pressure direction on the 3-d function coefficient A at a time of the predetermined pressure to obtain the current real coefficient A. Likewise, the block 1003 obtains the 3-d function coefficient B, the block 1005 obtains the 3-d function coefficient C, and the block 1007 obtains the 3-d function coefficient D. Blocks 1004, 1006, and 1008 perform interpolation in a pressure direction on the 3-d function coefficients B, C, and D to obtain the real coefficients B, C, and D respectively.

Then, the block 1009 uses the obtained 3-d function coefficients A, B, C, and D, and the phase IN_VVT of the intake valve 21 to calculate a 3-d function to obtain the intake air amount ratio VVTETA (also see the aforementioned expression (4)).

Figure 11:
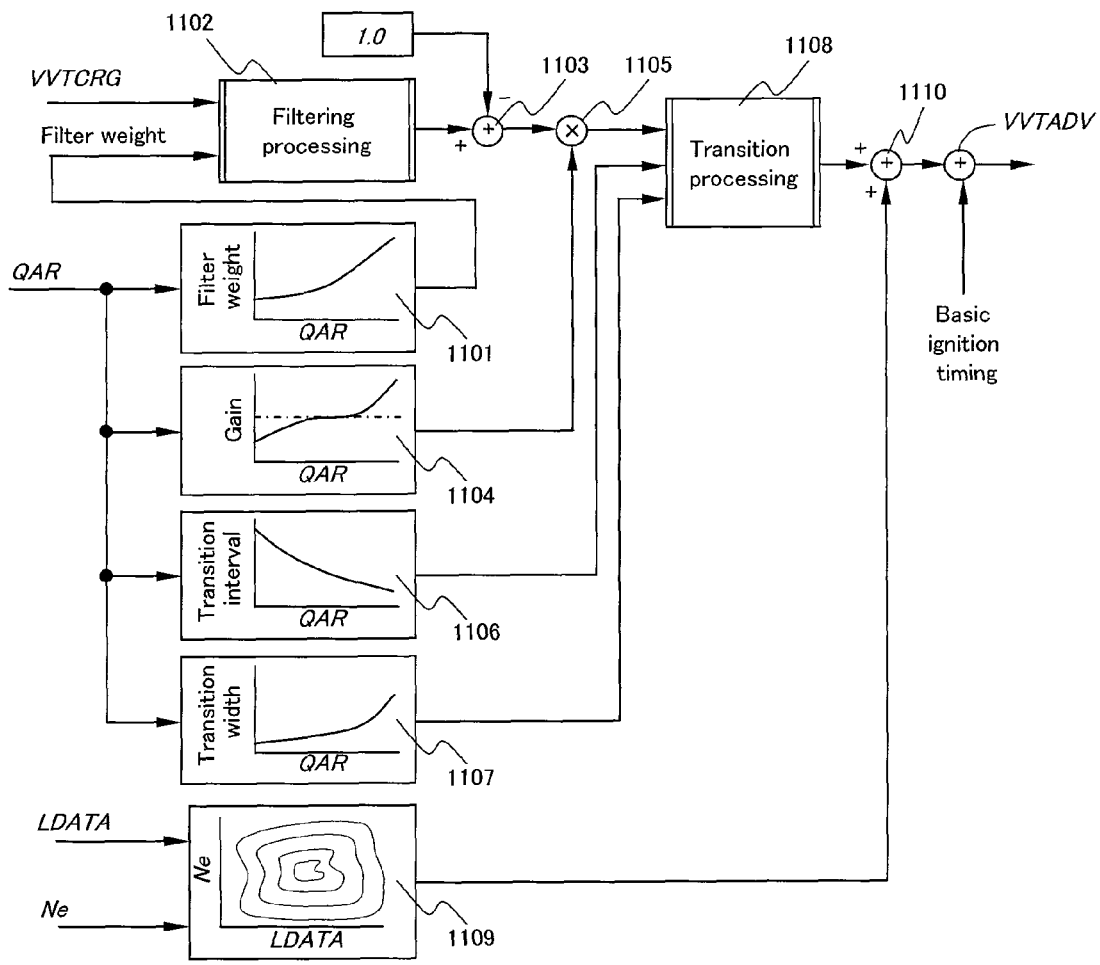
FIG. 11 is a block diagram illustrating an example of a process of correcting an ignition timing using an intake efficiency compensation coefficient V.

FIG. 11 illustrates an example of a block diagram for correcting an ignition timing using the above obtained intake efficiency compensation coefficient VVTCRG. A block 1101 performs a table-search for a filter weight using the mass air flow QAR into cylinder. A block 1102 uses the filter weight to perform filtering on the intake efficiency compensation coefficient VVTCRG (the intake efficiency compensation coefficient after the filtering is referred to as VVTCRGF). An adder 1103 calculates VVTCRGF−1.0. A block 1104 performs a table-search for a gain using the mass air flow QAR into cylinder. A multiplier 1105 calculates [(VVTCRGF−1.0)× gain]. Blocks 1106 and 1107 perform a table-search for a transition interval and a transition width respectively for transition processing using the mass air flow QAR into cylinder. A block 1108 is a transition processing block where the aforementioned [(VVTCRGF−1.0)×gain] is used as a base value of the compensation amount of an ignition timing compensation value; and when the value is changed, the change is followed by the transition interval and the transition width. A block 1109 performs a map search for a compensation amount of the ignition timing compensation value using the engine speed Ne and the engine load LDATA. An adder 1110 adds the compensation amount of the ignition timing compensation value and the transition processing output to generate an ignition timing compensation value VVTADV which is added to the basic ignition timing.

Figure 12:
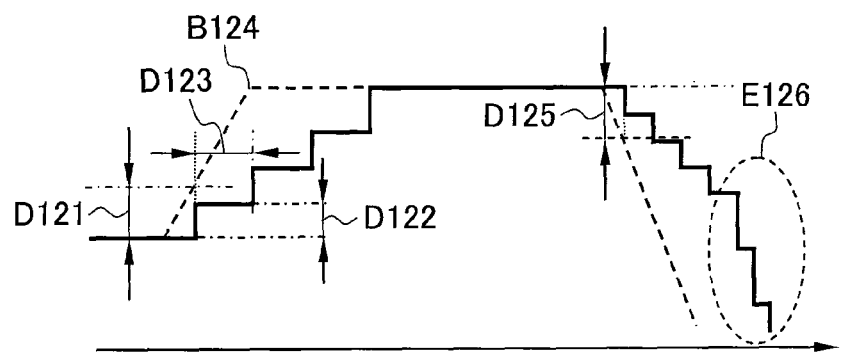
FIG. 12 illustrates an example of a timing chart of transition processing of a base value for compensation of an ignition timing compensation value.

FIG. 12 illustrates an example of a timing chart of transition processing of a base value for compensation of the ignition timing compensation value. A region (width) D121 indicates a dead zone on the rising side of the transition processing. When the base value rises from the dead zone region D121, the transition processing is started. The transition processing follows the base value B124 with a transition width D122 and a transition interval D123. A region (width) D125 indicates a dead zone on the falling side of the transition processing. When the base value falls from the dead zone region D125, the transition processing is re-started. Note that a region E126 indicates a state in which the transition processing width and interval are changed with a change in the mass air flow into cylinder.

Figure 13:
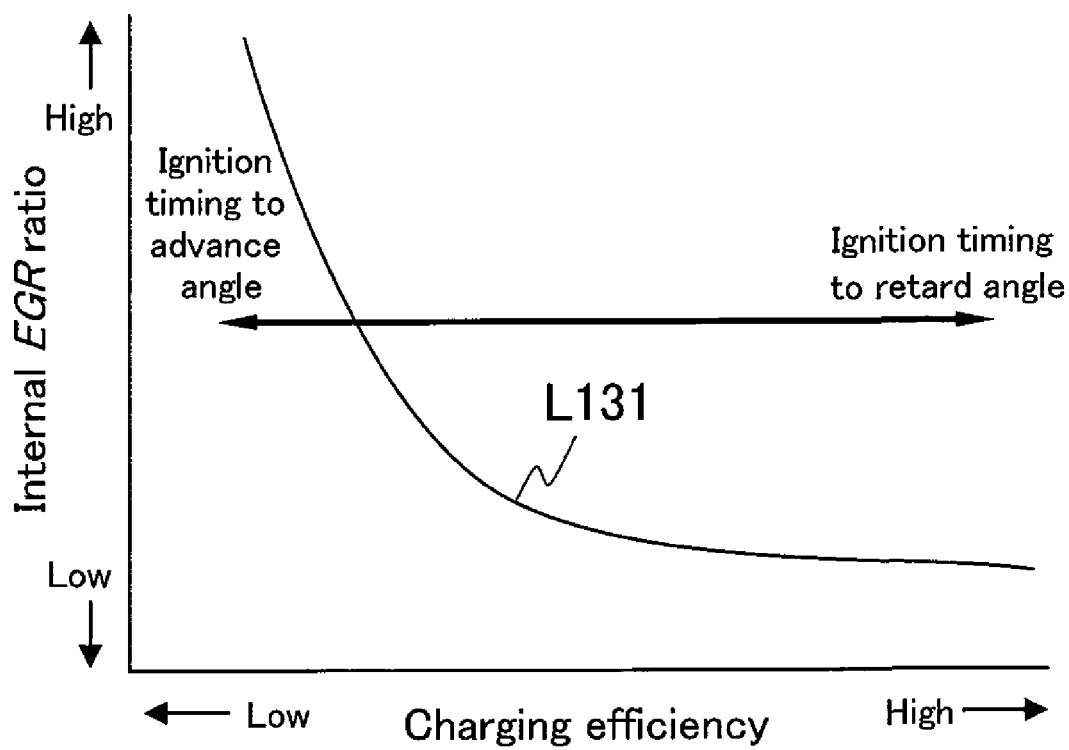
FIG. 13 is a characteristic chart illustrating an example of a relationship between an engine charging efficiency and an internal EGR ratio.

FIG. 13 is a characteristic chart illustrating an example of a relationship between an engine charging efficiency and an internal EGR ratio. As illustrated by a characteristic curve L131, the charging efficiency is inversely proportional to the internal EGR ratio. On a high charging efficiency side, the cylinder is filled with a large amount of inert gas (combustion residual gas) and thus the combustion speed is increased. Therefore, the ignition timing is set to a retard angle side. On a low charging efficiency side, the cylinder is filled with a small amount of inert gas and thus the combustion speed is decreased. Therefore, the ignition timing is set to an advance angle side.

Here, the charging efficiency is expressed as the following expression using an intake manifold internal pressure PMMHG, and an intake efficiency η, an intake efficiency compensation coefficient VVTCRG.

Charging efficiency=(intake manifold internal pressure/101.3 kPa)×intake efficiency×intake efficiency compensation coefficient The above expression indicates that the charging efficiency is proportional to the intake efficiency compensation coefficient VVTCRG. Therefore, in light of the relationship between the charging efficiency and the internal EGR ratio illustrated in FIG. 13, when the intake efficiency compensation coefficient VVTCRG is equal to or greater than 1.0, namely, when the current value VVTETA_real of the intake air amount ratio is equal to or greater than the target value VVTETA_target, the charging efficiency is high and the internal EGR ratio is low; and thus the ignition timing is corrected to the retard angle side. When the intake efficiency compensation coefficient is less than 1.0, the charging efficiency is low and the internal EGR ratio is high; and thus the ignition timing is corrected to the advance angle side.

Figure 14:
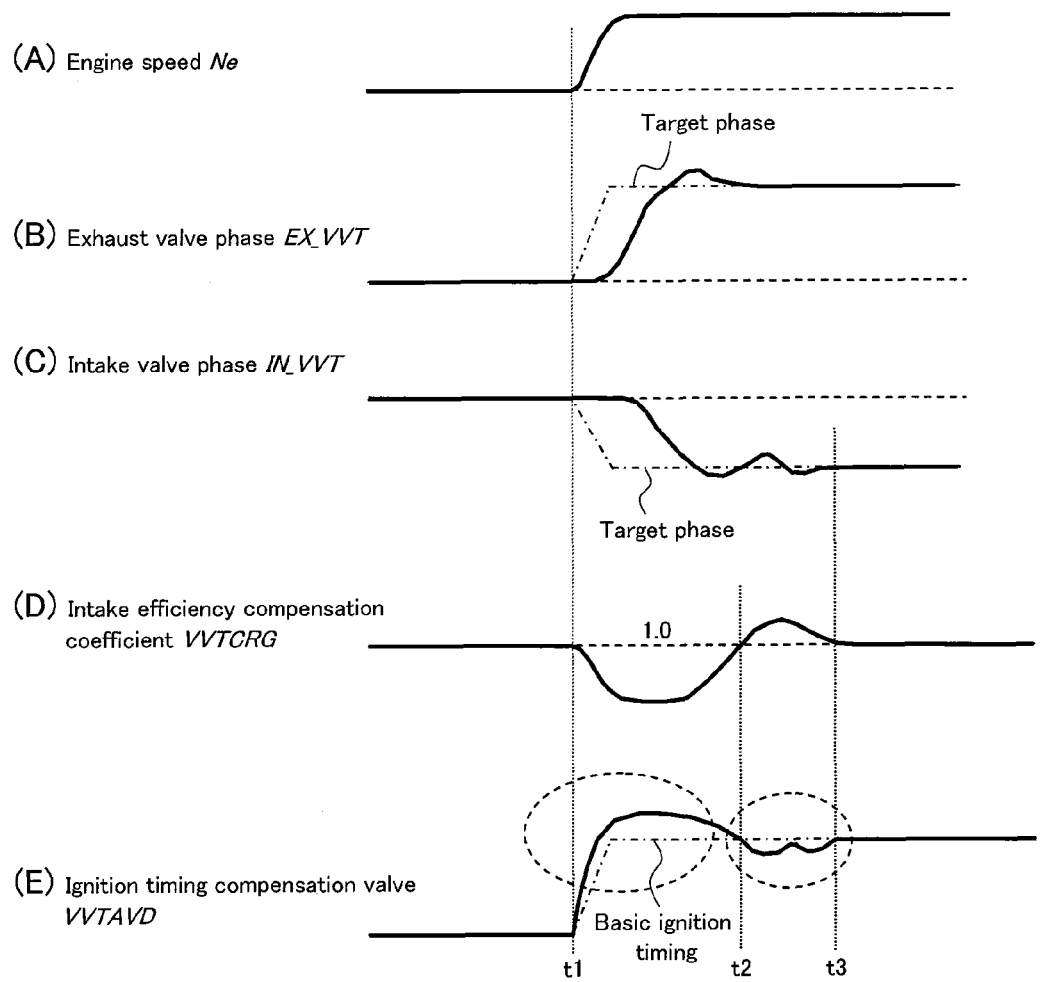
FIG. 14 illustrates an example of a timing chart when a transient compensation of the ignition timing is performed.

FIG. 14 illustrates an example of a timing chart when the aforementioned transient compensation of the ignition timing is performed. (A) indicates a change in engine speed Ne, (B) indicates a change in the phase EX_VVT of the exhaust valve 22, (C) indicates a change in the phase IN_VVT of the intake valve 21, (D) indicates a change in the intake efficiency compensation coefficient VVTCRG, and (E) indicates a change in the VVT ignition timing compensation value VVTADV. In the figure, the engine speed Ne starts to increase at time t1. The transient compensation of the ignition timing is performed during a period from time t1 to time t3. During the period from time t1 to time t3, as illustrated by an imaginary line in (B) and (C), the target phase of the exhaust valve 22 and the target phase of the intake valve 21 are calculated; and as illustrated by a solid line, the current real phase thereof is detected. In the beginning, the current real phase is smaller than the target phase, and thus the intake efficiency compensation coefficient VVTCRG is less than 1.0 (until time t2). During the period from time t1 to time t2, the VVT ignition timing compensation value VVTADV is corrected to an advance angle side from the base value indicated by the imaginary line in (E). During the period from time t2 to time t3 when the intake efficiency compensation coefficient VVTCRG is equal to or greater than 1.0, the VVT ignition timing compensation value VVTADV is corrected to a retard angle side from the base value.

Figure 15:
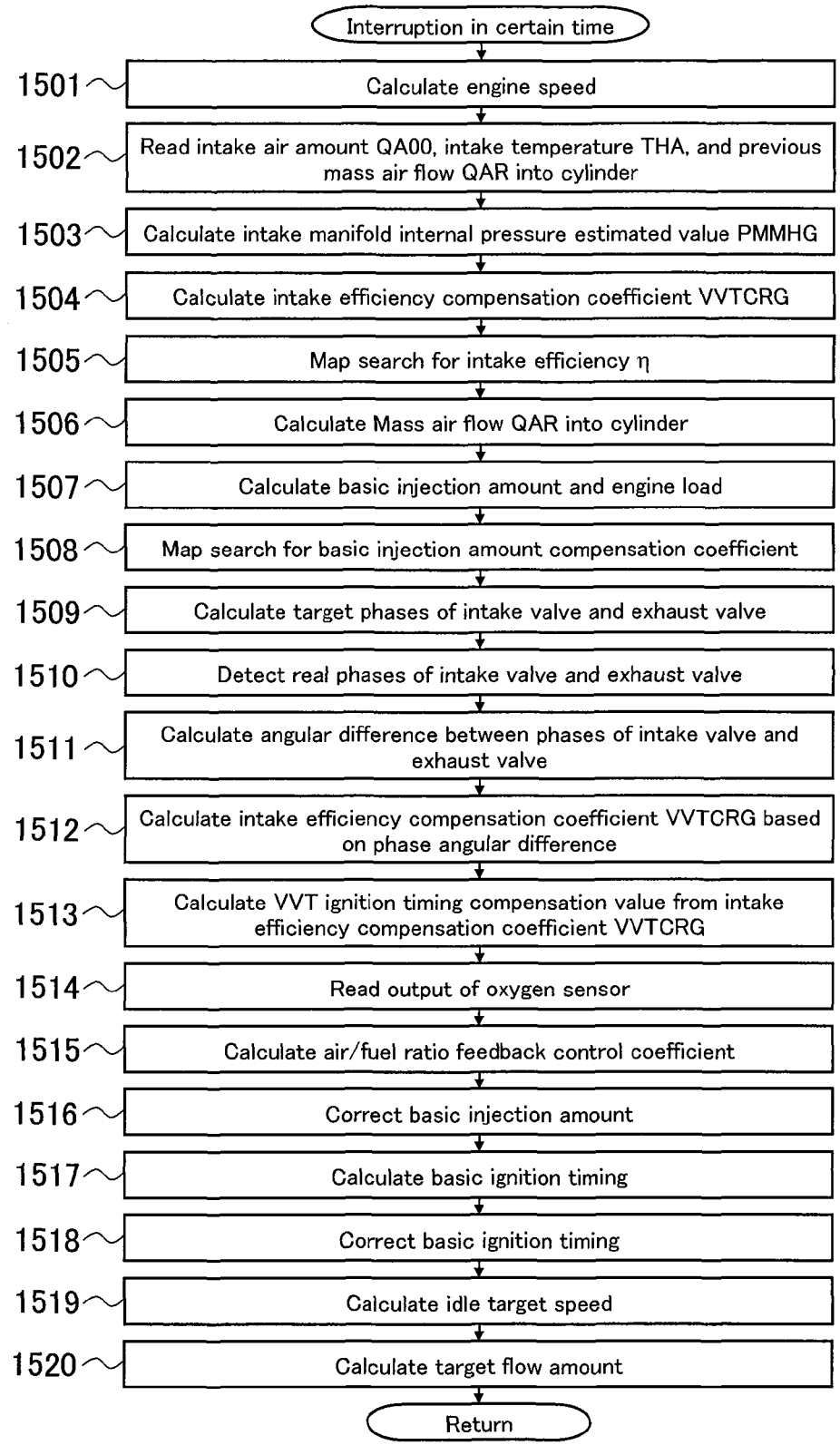
FIG. 15 is a flowchart illustrating an example of a control routine with a focus on an ignition timing transient compensation executed by a control unit.

FIG. 15 is a flowchart illustrating an example of a control routine with a focus on an ignition timing transient compensation executed by the control unit 100.

First, after an interruption, in step 1501, an engine speed is calculated based on a signal from a crank angle sensor. In step 1502, an intake air amount QA00 measured by an airflow sensor, an intake temperature THA measured by an intake temperature sensor and a previous mass air flow QAR into cylinder are read. In step 1503, the current intake manifold internal pressure PMMHG (estimated value) is calculated based on the intake air amount QA00, a previous intake manifold internal pressure PMMHG (estimated value), and a previous mass air flow into cylinder. In step 1504, the intake efficiency compensation coefficient VVTCRG is calculated. In step 1505, a map search is performed for an intake efficiency η using the engine speed and the engine load. In step 1506, the mass air flow QAR into cylinder is calculated using the engine speed, the intake temperature THA, the intake manifold internal pressure PMMHG, and the intake efficiency η corrected by the intake efficiency compensation coefficient VVTCRG.

In step 1507, a basic injection amount and an engine load are calculated by the engine speed and the mass air flow QAR into cylinder. In step 1508, a map search is performed for a basic injection amount compensation coefficient using the engine speed and the engine load. In step 1509, a map search is performed for target phases of the intake valve 21 and the exhaust valve 22 using the engine speed and the engine load. In step 1510, real phases of the intake valve 21 and exhaust valve 22 are detected. In step 1511, an angular difference between a target phase and a real phase of the intake valve 21 and exhaust valve 22 is detected.

In step 1512, an intake efficiency compensation coefficient VVTCRG is calculated based on the angular difference. The engine speed and the intake manifold internal pressure are used for this calculation. In step 1513, a VVT ignition timing compensation value VVTADV is calculated from the intake efficiency compensation coefficient VVTCRG.

In step 1514, an output of the oxygen sensor 57 is read. In step 1515, an air/fuel ratio feedback control coefficient is calculated so as to achieve the target air/fuel ratio (theoretical air/fuel ratio). In step 1516, a basic injection amount is corrected by the air/fuel ratio feedback control coefficient and the basic injection amount compensation coefficient. In step 1517, a map search is performed for a basic ignition timing using the engine speed and the engine load. In step 1518, the basic ignition timing is corrected by the intake efficiency compensation coefficient VVTCRG. In step 1519, an idle target speed is calculated. In step 1520, a target flow amount is calculated so that the idle speed becomes the target speed and the ISC valve 45 is controlled by a feedback control and the like.

Figure 16:
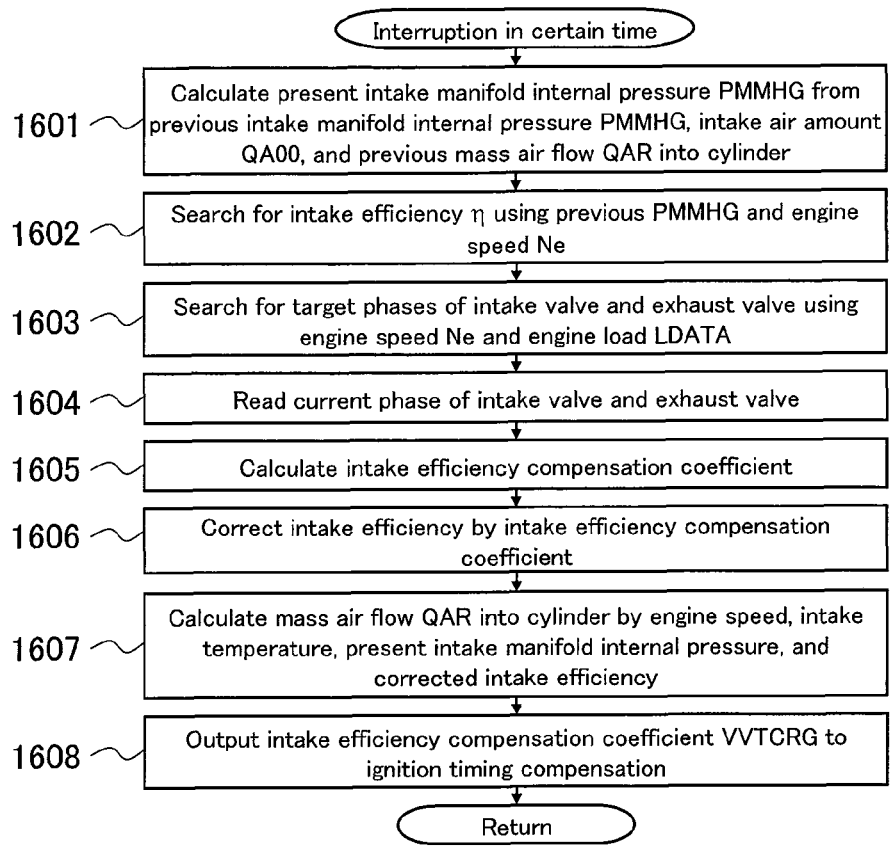
FIG. 16 is a flowchart illustrating an example of a procedure for calculating a mass air flow into cylinder (theoretical intake air amount value).

FIG. 16 is a flowchart illustrating an example of a procedure for calculating the aforementioned mass air flow into cylinder (theoretical intake air amount value). In step 1601, a present intake manifold internal pressure PMMHG is calculated from the previous intake manifold internal pressure PMMHG, the detected intake air amount QA00, and the previous mass air flow QAR into cylinder. In step 1602, a map search is performed for an intake efficiency η using the previous PMMHG and the engine speed Ne. Note that the previous value is used as the intake manifold internal pressure, but the present value may be used as the intake manifold internal pressure depending on the control flow (program call). In step 1603, the engine speed Ne and the engine load LDATA are map searched for target phases of the intake valve 21 and the exhaust valve 22. In step 1604, the current phases of the intake valve 21 and the exhaust valve 22 are read. In step 1605, the intake efficiency compensation coefficient VVTCRG is calculated using the target phases and the current phases of the intake valve 21 and the exhaust valve 22, the engine speed, and the intake manifold internal pressure. In step 1606, the intake efficiency η is corrected by the intake efficiency compensation coefficient VVTCRG. In step 1607, the mass air flow QAR into cylinder is calculated by the engine speed, the intake temperature, the present intake manifold internal pressure, and the corrected intake efficiency η. In step 1608, the intake efficiency compensation coefficient VVTCRG is outputted to the VVT ignition timing compensation.

Figure 17:
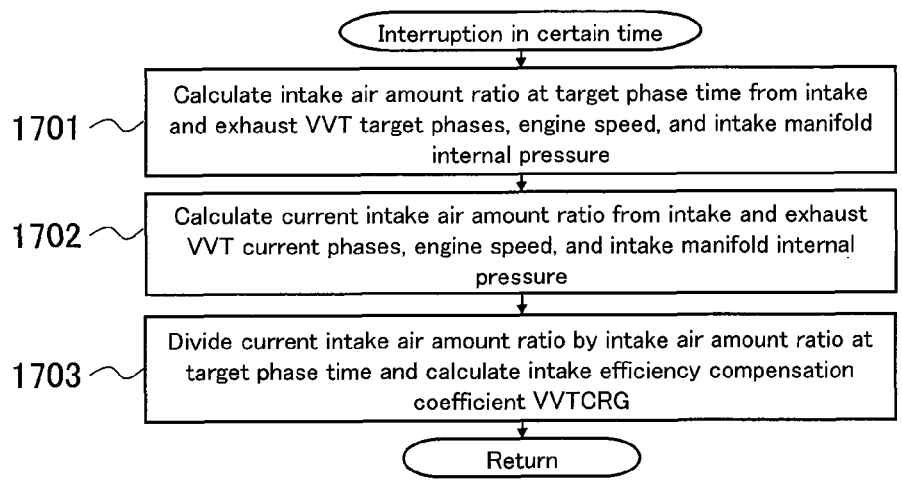
FIG. 17 is a flowchart illustrating an example of a procedure for calculating an intake efficiency compensation coefficient.

FIG. 17 is a flowchart illustrating an example of a procedure for calculating the aforementioned intake efficiency compensation coefficient VVTCRG. In step 1701, the intake air amount ratio at a time of the target phase is calculated from target phases of the intake valve 21 and the exhaust valve 22, the engine speed, and the intake manifold internal pressure. In step 1702, the current intake air amount ratio is calculated from the current phases of the intake valve 21 and the exhaust valve 22, the engine speed Ne, and the intake manifold internal pressure. In step 1703, the intake efficiency compensation coefficient VVTCRG is calculated by dividing the current intake air amount ratio by the intake air amount ratio at a time of the target phase.

Figure 18:
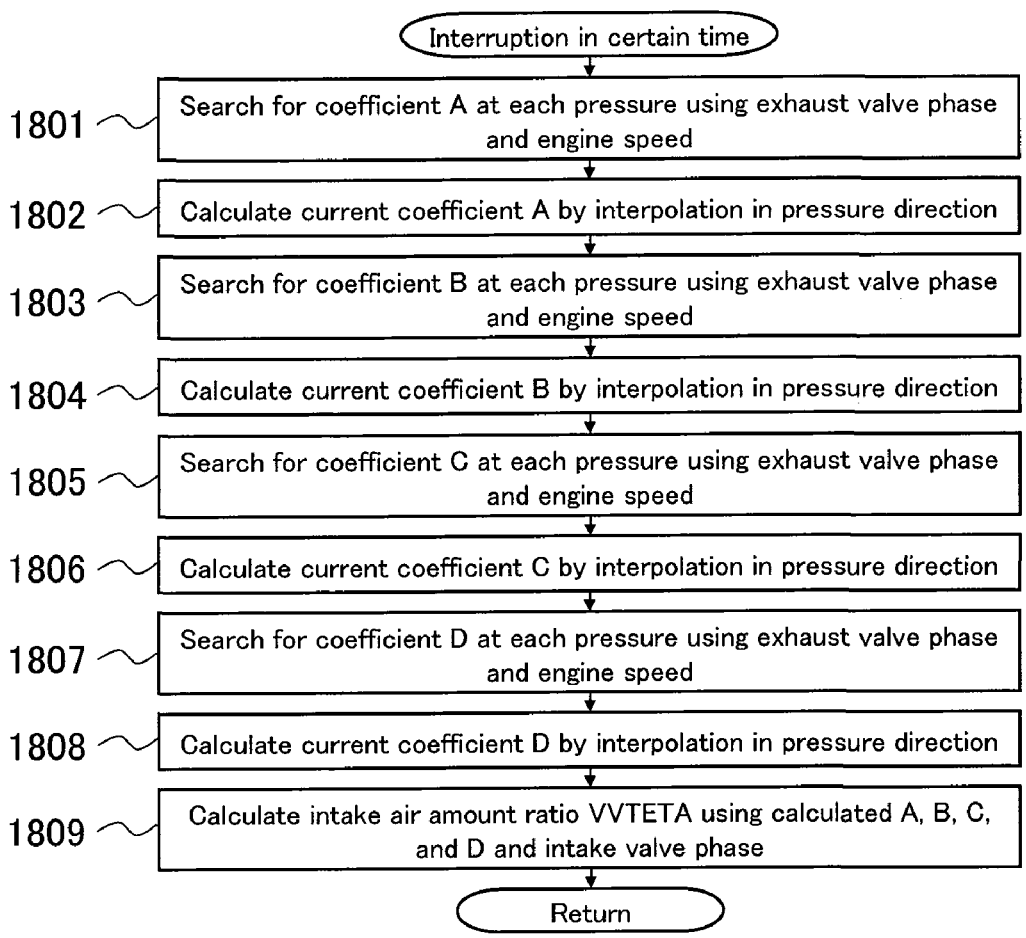
FIG. 18 is a flowchart illustrating an example of a procedure for calculating an intake air amount ratio.

FIG. 18 is a flowchart illustrating an example of a procedure for calculating the aforementioned intake air amount ratio. In step 1801, the 3-d function coefficient A when the intake manifold internal pressure PMMHG is at each predetermined pressure (pressure 1, pressure 2, pressure 3, and pressure 4) is obtained using the phase EX_VVT of the exhaust valve 22 and the engine speed Ne. In step 1802, interpolation in a pressure direction is performed on the 3-d function coefficient A at a time of the predetermined pressure to obtain the current real coefficient A. Likewise, in step 1803, the 3-d function coefficient B is obtained; in step 1805, the 3-d function coefficient C is obtained; in step 1807, the 3-d function coefficient D is obtained; in steps 1804, 1806, and 1808, interpolation in a pressure direction is performed on the 3-d function coefficients B, C, and D to obtain the current real coefficients B, C, and D respectively. Finally, in step 1809, intake air amount ratio VVTETA is calculated using the coefficients A, B, C, and D and the phase of the intake valve 21.

Figure 19:
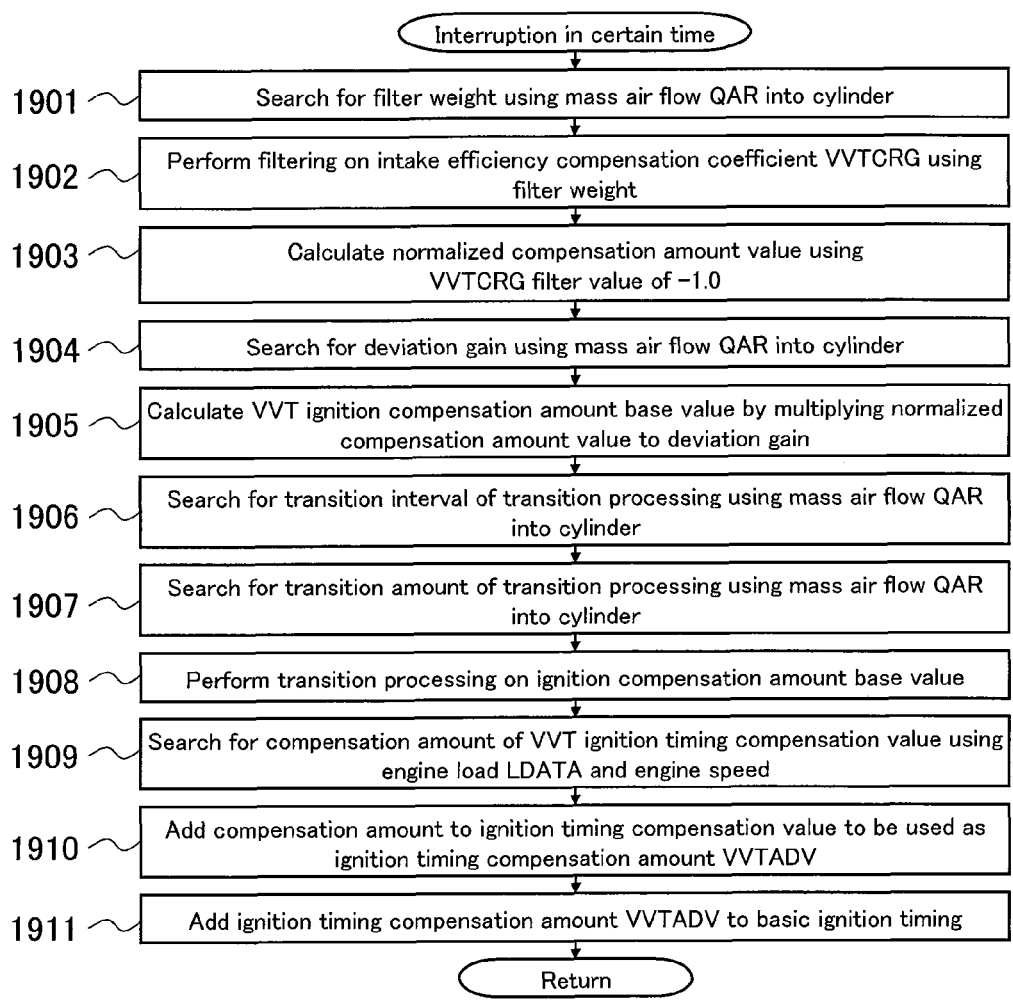
FIG. 19 is an example of a flowchart of a VVT ignition timing compensation.

FIG. 19 is an example of a flowchart of the aforementioned VVT ignition timing compensation. In step 1901, the filter weight is calculated using the mass air flow QAR into cylinder. In step 1902, filtering is performed on the intake efficiency compensation coefficient VVTCRG using the filter weight. In step 1903, the normalized value of the compensation amount is calculated using a VVTCRG filter value of −1.0. In step 1904, a table search is performed for a deviation gain (sensitivity to the normalized compensation amount value) using the mass air flow QAR into cylinder. In step 1905, the ignition compensation amount base value is calculated by multiplying the normalized compensation amount value to the deviation gain. In step 1906, a table search is performed for a transition interval of transition processing described later using the mass air flow QAR into cylinder. In step 1907, a table search is performed for a transition width of transition processing described later using mass air flow QAR into cylinder. In step 1908, transition processing following with the transition width for each the transition interval is performed on the ignition compensation amount base value. In step 1909, a map search is performed for the compensation amount of the ignition timing compensation value using the engine load and the engine speed. In step 1910, the compensation amount undergoing the transition processing is added to the ignition timing compensation value to be used as the ignition timing compensation amount VVTADV. In step 1911, the ignition timing compensation amount VVTADV is added to the basic ignition timing.

As described above, the engine control device 1 of the present embodiment is configured such that the ratio between a current value and a target value of the intake air amount ratio corresponding to a shift amount or its correlation value between a theoretical intake air amount value and a current real intake air amount is obtained; as well as the intake efficiency compensation coefficient for correcting the ratio according to an angular difference between a real phase and a target phase is obtained; and this compensation coefficient is used to make a transient compensation of the ignition timing. In this case, a change in the compensation coefficient indicates a change in the engine charging efficiency, and the change in the engine charging efficiency indicates a change in internal EGR amount. Therefore, a compensation of the ignition timing according to the change in the internal EGR amount can prevent a combustion deterioration (occurrence of knocking or the like) due to an excessive advance angle of an intake/exhaust valve at a transition time, a torque down due to an excessive retard angle, and the like. This leads to an optimal torque control and a promising prospect for improving fuel efficiency and the like.

In addition, a simple use of an approximate expression in a process of calculating the compensation coefficient can prevent a complicated and large-scale calculation model and can determine a variable from actual data, thus reducing an error.

Further setting a sensitivity, a transition width, a transition interval, and the like according to an operating state (a parameter indicating the operating state) such as an intake air amount to the compensation coefficient of the ignition timing can further reduce an error as well as further increase combustion characteristics.

What is claimed is:

1. An engine control device having a variable valve timing mechanism capable of changing a phase of an intake valve and/or an exhaust valve, wherein an angular difference between a current real phase of the intake/exhaust valve and a target phase set based on an engine load equivalent amount such as an intake air amount is obtained; a shift amount or its correlation value between a current real intake air amount and a theoretical intake air amount value calculated using an intake pipe internal pressure when a phase of the intake/exhaust valve has reached the target phase is obtained; further a correction coefficient for matching the shift amount or its correlation value with the angular difference is obtained; and the correction coefficient is used to perform transient correction of an ignition timing.

2. The engine control device according to claim 1, wherein as the shift amount or its correlation value, a ratio between a real intake air amount and a theoretical intake air amount value calculated using an engine speed, an engine displacement, a gas constant, an intake temperature and an ideal gas equation of state is obtained.

3. The engine control device according to claim 1, wherein as the shift amount or its correlation value, a ratio between a real intake air amount and a theoretical intake air amount value calculated using an engine speed, an engine displacement, a gas constant, an intake temperature fixed to a predetermined temperature and an ideal gas equation of state is obtained.

4. The engine control device according to claim 1, wherein an approximation curve indicating a relationship between a phase of the intake/exhaust valve and an intake air amount is obtained for each operating range; a coefficient of the approximation curve is stored for each operating range; and the stored coefficient is used to calculate the ratio between a current real intake air amount and a theoretical intake air amount value at the target phase time.

5. The engine control device according to claim 1, wherein an ignition timing at a transition time is configured to be corrected such that if a ratio between the real intake air amount and the theoretical intake air amount value is equal to or greater than 1.0, the ignition timing is corrected to a retard angle side; and if the ratio is less than 1.0, the ignition timing is corrected to an advance angle side.

6. The engine control device according to claim 1, wherein at a time of transient correction of the ignition timing, the ignition timing is corrected by a sensitivity according to an intake air amount.

7. The engine control device according to claim 1, wherein at a time of transient correction of the ignition timing, the ignition timing is corrected by a transition width and a transition interval according to an intake air amount.

* * * * *